United States Patent [19]

Gutierrez

[11] Patent Number: 5,088,224
[45] Date of Patent: Feb. 18, 1992

[54] FISHING ROD HOLDER AND STAND

[76] Inventor: Manuel Gutierrez, 1273 Meadow Sweet Rd., Golden, Colo. 80401

[21] Appl. No.: 649,677

[22] Filed: Feb. 1, 1991

[51] Int. Cl.⁵ ............................................. A01K 97/10
[52] U.S. Cl. ....................................... 43/21.2; 43/15; 43/17; 211/70.8; 248/316.5; 248/538
[58] Field of Search ................... 43/15, 17, 21.2; 211/70.8; 248/538, 539, 520, 523, 316.5, 316.6; 269/130, 131, 133, 238

[56] References Cited

U.S. PATENT DOCUMENTS

| | | | |
|---|---|---|---|
| 138,861 | 5/1873 | Cooper | 248/539 |
| 1,534,642 | 4/1925 | Hoagland | 248/533 |
| 2,220,234 | 11/1940 | Hadaway | 248/538 |
| 2,516,245 | 7/1950 | Nickerson | 43/21.2 |
| 2,553,231 | 5/1951 | Bayto | 248/42 |
| 2,573,635 | 10/1951 | Williams | 248/42 |
| 2,844,981 | 7/1958 | Steine | 248/534 |
| 2,861,761 | 11/1958 | Nordell | 248/38 |
| 2,926,874 | 3/1960 | Hahn | 248/44 |
| 2,971,734 | 2/1961 | Grimes | 248/44 |
| 3,570,793 | 3/1971 | Shackel | 248/42 |
| 3,837,109 | 9/1974 | DeJulio | 43/15 |
| 3,973,346 | 8/1976 | Mason | 43/15 |
| 4,215,838 | 8/1980 | Gullota | 248/316.5 |
| 4,443,963 | 4/1984 | Braaten | 43/21.2 |
| 4,635,390 | 1/1987 | Walters | 248/538 |
| 4,650,146 | 3/1987 | Duke | 248/512 |
| 4,674,222 | 6/1987 | Hughes | 43/21.2 |
| 4,739,914 | 4/1988 | Pothetes | 224/253 |
| 4,828,152 | 5/1989 | Pepping | 224/200 |
| 4,871,099 | 10/1989 | Bogar, Jr. | 224/42.45 |
| 4,901,970 | 2/1990 | Moss et al. | 248/514 |

FOREIGN PATENT DOCUMENTS

| | | | |
|---|---|---|---|
| 2253454 | 7/1975 | France | 43/21.2 |
| 2442009 | 7/1980 | France | 43/21.2 |
| 2590962 | 6/1987 | France | 43/21.2 |

OTHER PUBLICATIONS

Ad labelled Exhibit 4 Quality Rod Holders; and Roberts #1 (with Locking ring).
Ad labelled Exhibit 5 Action Products Rod Holder (with Sliding lock ring).
Ad labelled Exhibit 6 Scotty ® Rod Holders.
Ad labelled Exhibit 1 Tite-Lok ® Rod Holder Ser. 610, 630.
Ad labelled Exhibit 2 Tite-Lok ® 725 Porta-Lok Fish Finder Holder.
Ad labelled Exhibit 3 Gear Lock Rod Holder (with Locking ring) Quick Release Rod Spring 1990—Cabelas Holder; etc.

*Primary Examiner*—Richard K. Seidel
*Assistant Examiner*—Jeanne M. Elpel

[57] ABSTRACT

A holder for a fishing rod that has a rearward rod handle support, a forward rod handle support, and a frame upon which the supports are mounted. The forward rod handle support having a first and second finger mounted for pivotal movement of their tips toward each other when a downward force is applied to a cable connecting the bottom end portions of the fingers. Also, a holder having a frame with a pair of rails, a rearward cable with each of its ends secured to one of the rails, and a forward cable with each of its ends secured to one of the rails. Additionally a holder with a frame having a rearward rod handle support loop, a forward upwardly extending pair of rails with a cable connecting them, and a central double rail portion. The holders can include a curved strip member, a circular cylindrical mounting block with an annular recess, or grooved mounting block with a positioning bar and tightening means. Finally, folding stands are disclosed having: (a) a bottom strip member with a foot ledge and a spiked lower end, and a top strip member with a mounting ledge and at least two projections at its bottom end; and (b) an L-bracket, a vertical support member pivotally engaged with the vertical portion of the L-bracket, a pivot rod through the vertical portion and the vertical support member, and a first, second, and third extension support.

25 Claims, 7 Drawing Sheets

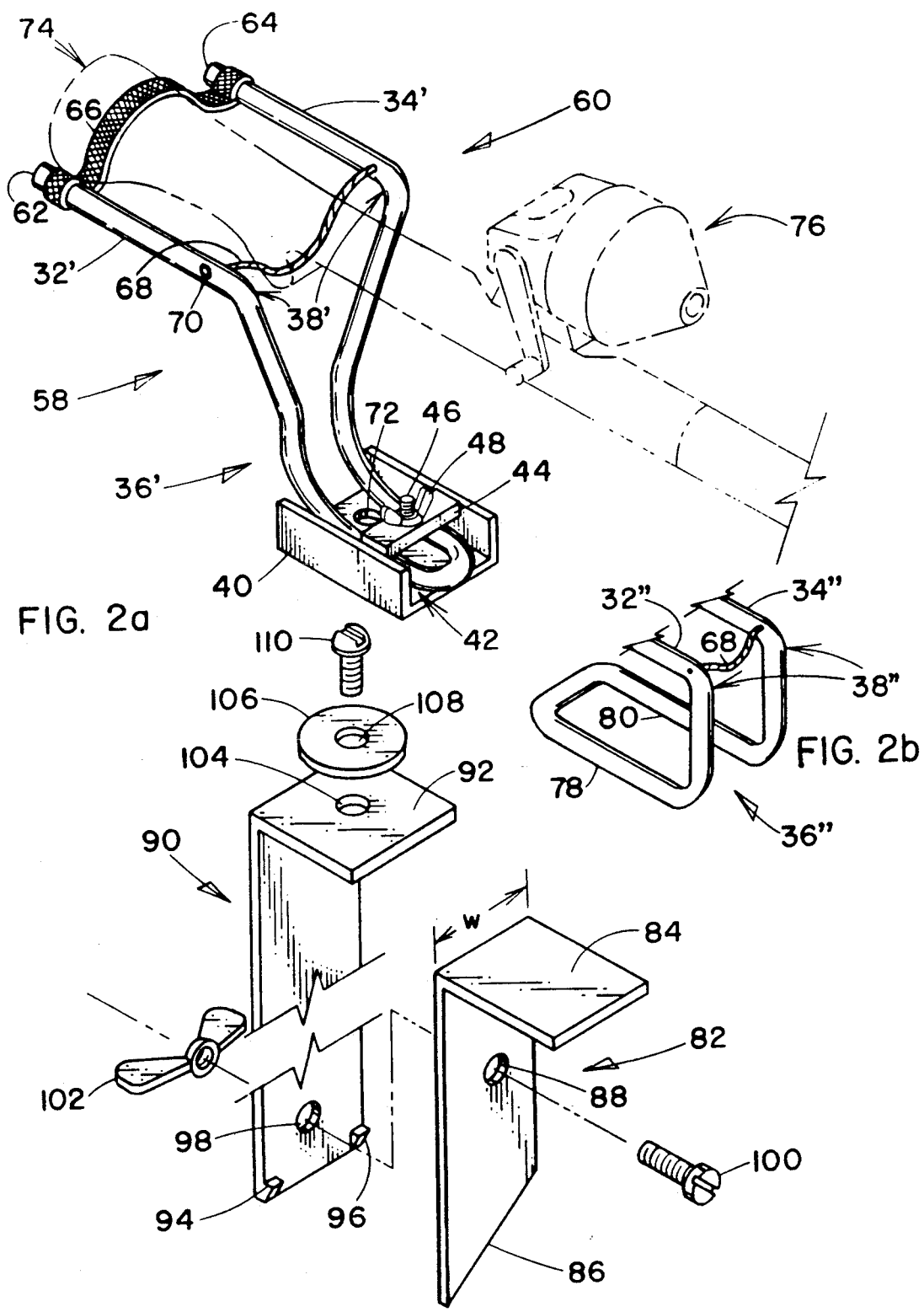

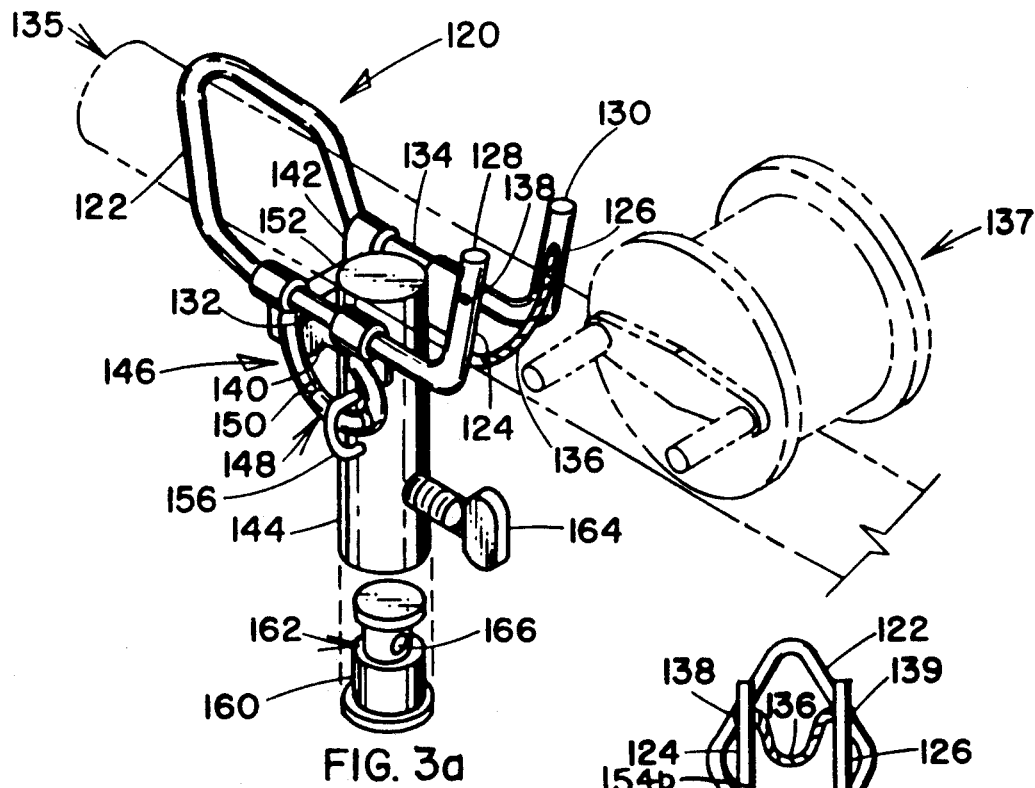
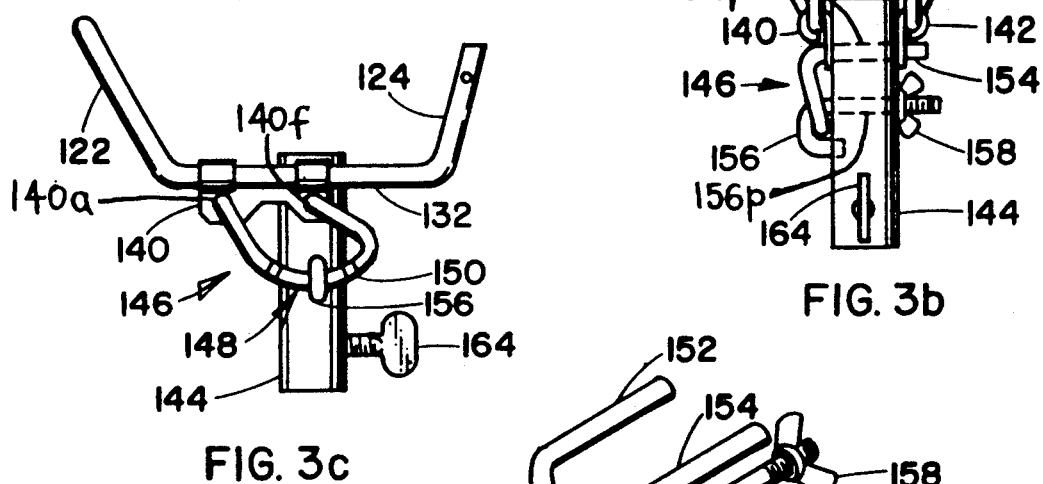
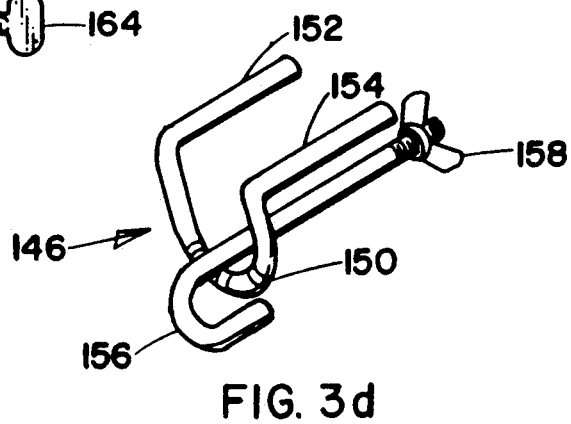
FIG. 3a
FIG. 3b
FIG. 3c
FIG. 3d

FISHING ROD HOLDER AND STAND

BACKGROUND OF THE INVENTION

In general, this invention relates to devices for holding the end portions of cylindrical tubes and rods as well as portable stands capable of supporting such devices. More particularly, this invention relates to lightweight (a) fishing rod holders with one or more of the following: an auto-hold-and-release mechanism, cable rod supports, a horizontal tilt-adjust mechanism, and a swivel strike indicator, and (b) folding stands for supporting a load such as a fishing rod holder.

U.S. Pat. Nos: 3,570,793 issued to Shackel on 16 March 1971; 2,573,635 issued to Williams on 30 October 1951; 3,837,109 issued to DeJulio on 24 September 1974; and 4,674,222 issued to Hughes on 23 June 1987; 1,534,642 issued to Hoagland on 21 April 1925; 2,553,231 issued to Bayto on 15 May 1951; 2,926,874 issued to Hahn on 1 March 1960; and 567,084 issued to Eicher on 1 September 1896 each disclose fishing rod support devices having fore and aft braces for rod handles. These devices are complex, unstable, or awkward to use. Shackel, Williams, Hoagland, Bayto, Hahn, and Eicher each disclose various attitude adjustment mechanisms. The TITE-LOK ® series 610 and 630 Rod Holders are upwardly open U-frames having an open-V at one end and a loop formed with the other end. Since the mounting brackets of the TITE-LOK ® Rod Holders cannot swivel, fishing rods held by these Rod Holders pull out of the open-V when either (a) a quick lateral or downward force is applied to the fishing line, such as that exerted by a strike, or (b) a more sustained lateral force is applied to the fishing rod held by the TITE-LOK ® Rod Holder.

None of the known rod holders are designed with a hold-and-release mechanism which allows an individual to, with a single hand, position a fishing rod therein and later release it. None of the known rod holders have a swivel strike indicator to minimize the risk of losing a fishing rod held thereby when a fish strikes a line, or when other quick lateral forces are applied to the fishing rod. No known self-supporting stands have the stability that the instant invention displays, and none are as compact and as easy to transport.

SUMMARY OF THE INVENTION

It is a primary object of this invention to provide a relatively lightweight and easy to use device that can effectively support and hold the end portions of cylindrical tubes and rods such as fishing rod handles. It is also a primary object of this invention to provide a portable folding stand for supporting a load such as a fishing rod holder.

The advantages of providing a device and stand as described herein are: (a) versatility--many fishing rod handle shapes and sizes can be accommodated; (b) the hold-and-release mechanism as designed more tightly grips a rod handle as greater force is exerted on it; (c) both the hold-and-release mechanism and the swivel strike indicator, independently and together, minimize the risk of losing a rod when a fish strikes a line or the rod is accidentally bumped; and (d) the simplicity of the holder and stand designs make them easy to operate and fabricate.

Briefly described, the invention includes a holder for a fishing rod that has a rearward rod handle support, a forward rod handle support, and a frame upon which the supports are mounted. The forward rod handle support has a first and second finger mounted for pivotal movement of their tips in unison toward each other when a downward force is applied to a cable connecting the bottom end portions of the fingers. Another characterization of the invention is a fishing rod holder having a frame with a generally parallel pair of rails, a rearward cable with each of its ends secured to one of the rails, and a forward cable with each of its ends secured to one of the rails. A further characterization includes a holder with a frame having a rearward rod handle support loop, a forward upwardly extending pair of rails, and a central double rail portion therebetween. Secured to each of the upwardly extending pair of rails is one end of a cable. To mount the versatile holders described herein to a folding stand of the invention, the edge of a boat, or any other portable or fixed support device, the holders can include a curved strip member (for example in the shape of a "C"), a circular cylindrical mounting block with an annular recess, or a grooved mounting block with a positioning bar and tightening means to secure a curved rail end portion therebetween.

Final characterizations of the invention include folding stands having: (a) a bottom strip member with a foot ledge and a spiked lower end, and a top strip member with a mounting ledge and at least two projections at its bottom end, the bottom and top strip members coupled for folding thereat; and (b) an L-bracket, a vertical support member pivotally engaged in locking fashion with the vertical portion of the L-bracket, a pivot rod through the vertical portion and at least a portion of the vertical support member, and a first, second, and third extension support coupled with the horizontal portion of the L-bracket for folding thereat.

BRIEF DESCRIPTION OF THE DRAWINGS

The invention will be more particularly described by referencing the accompanying drawings of the preferred embodiments, in which like numerals designate like parts.

FIG. 2a is an isometric pictorial of another preferred holder and an exploded isometric view of a preferred folding stand of the invention.

FIG. 2b is a partial pictorial of an alternative holder frame of the invention.

FIG. 3a is an isometric pictorial of a further preferred holder of the invention illustrating (in phantom) a fishing rod handle and reel positioned in the holder.

FIG. 3b is a front elevational view of the holder shown in FIG. 3a.

FIG. 3c is a left hand side elevational view of the holder shown in FIG. 3a.

FIG. 3d illustrates the tilt-adjust member and J-bolt of the holder shown in FIGS. 3a, 3b, and 3c.

FIG. 4b illustrates the frame of the holder shown in FIG. 4a.

FIG. 9b is an enlarged, partial sectional of the stand of FIG. 9a.

DETAILED DESCRIPTION OF THE PREFERRED EMBODIMENTS

Figure 1:
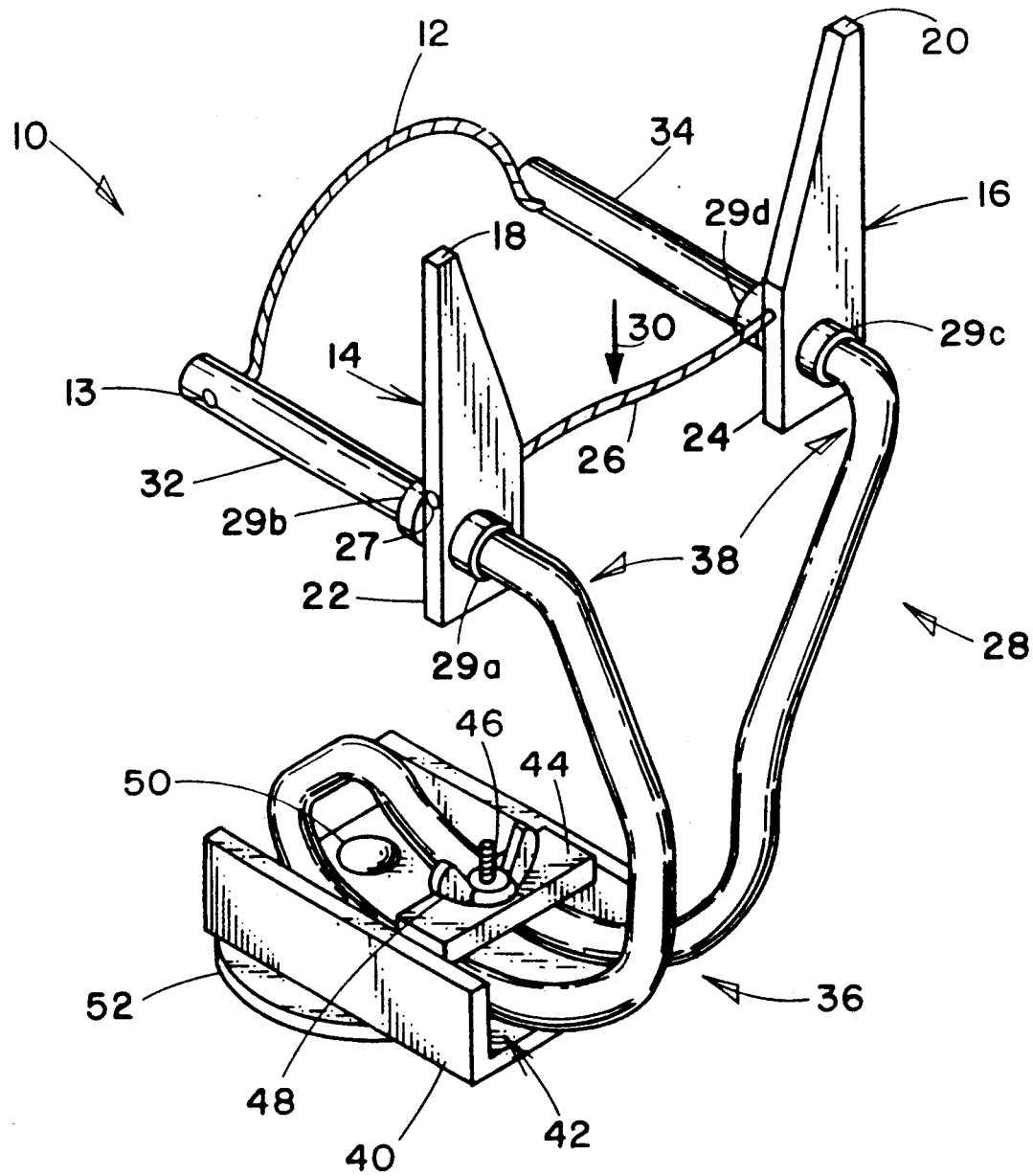
FIG. 1 is an isometric pictorial of a preferred holder of the invention.

Shown at 10 of FIG. 1 is a preferred holder with: a frame 28 having a pair of rails 32, 34, curved rail end portion 36 which extends downwardly and back under the rails to form a C-shape, and bent rail section 38; a rearward rod handle support in the form of a cable 12 with one end secured to rail 32 and the other end secured to rail 34; and a forward rod handle support in the form of fingers 14, 16 connected between their bottom end portions 22, 24 by cable 26 and mounted for pivotal movement of tips 18, 20 in unison toward each other when a force along the direction indicated by arrow 30 is applied to cable 26.

Cables 12, 26 can be secured using any suitable means such as drilling a small hole through the rails 32, 34 or fingers 14, 16, inserting the cable ends therethrough, and soldering the tips of the cables to form beads 13, 27. Although not shown, wrapping the cable completely around a rail or finger and twisting the leading end back around the cable or pinching or clamping the ends of the cables are other ways cables 12 or 26 may be secured. Cables 12, 26 can be made of single or multiple strands or could be multiple link chains. The strands of a multiple strand cable could be woven or twisted, flat or circular cylindrical. Suitable sturdy cable materials include galvanized metals or alloys, nylon, reinforced plastic, fibers, or leather. The cables can be coated with an elastomeric material, or encased within vinyl or other flexible tubing or a mechanical spring, to protect a rod handle within the holder from damage.

Figure 8:
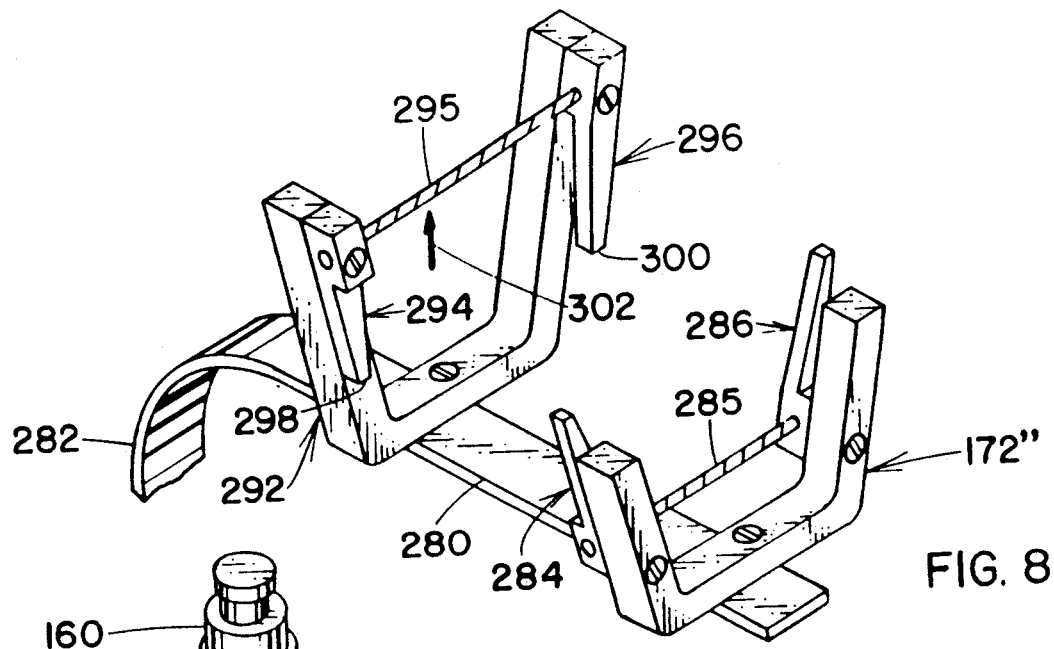

Cable 12 can be interchanged with a second set of fingers (not shown) pivotally mounted on rails 32, 34 and oriented like fingers 294, 296 of FIG. 8 so that they move in unison toward each other when an upward force is applied to a cable connecting the fingers.

Frame 28 can be made from metal, alloy, thermoplastic or thermosetting resin, or any other suitable formable material with some elasticity capable of providing sufficient support, in the form of rod, bar, or tubing of varying cross-sections. Fingers 14, 16 can be metal, alloy, fiberglass, a thermoplastic or thermosetting resin, an elastomer or other suitable materials exhibiting sufficient rigidity to generally hold a shape while supporting a fishing rod handle.

Fingers 14, 16 can be mounted so that tips 18, 20 are located in offset spaced relationship to one another. This prevents them from colliding if rod handles with relatively small diameters are placed in the holder. FIG. 1 illustrates finger 16 mounted further forward at least a distance equal to the thickness of finger 14 to prevent the collision of tips 18, 20. Fingers 14, 16 are held in place by vinyl tubing pieces 29a, 29b, 29c, 29d. Fingers 14, 16 and these vinyl tubing pieces are mounted on rails 32, 34 in a manner that allows one to adjust the location of the fingers with relative ease. This provides holder 10 with a means of accommodating handles of varying length.

Curved rail end portion 36 fits into groove 42 of mounting block 40 so that positioning bar 44, threaded bolt 46, and wing nut 48 can secure curved rail end portion 36 into place. This collection of components, or horizontal tilt-adjust mechanism, provides a means for adjusting the attitude of a rod in holder 10. Bolt 50 through mounting block 40 and washer 52, can be used with a nut (beneath washer 52) for swivel engagement of holder 10 to any portable or fixed supporting device. This collection of components can operate as a swivel strike indicator to alert an individual of a fish strike by allowing a rod held by rod holder 10 to rotate about bolt 50.

Holder 60 of FIG. 2a has a frame 58 with a pair of rails 32', 34', a curved rail end portion 36' which extends downwardly and out away from rails 32', 34' to form a J-shape, and a bent rail section 38' therebetween. Rearward cable 66 is shown as a flat, woven multiple strand cable: it can be any of the alternatives mentioned above for cables 12, 26. The ends of cable 66 have each been wrapped around rails 32', 34' nearby rearward rail ends 62, 64 and soldered back against the cable. In a manner similar to cable 12 of FIG. 1, the ends of cable 68 have been secured to rails 32', 34' to produce solder beads 70 (the other is behind rail 34'). Rod handle 74 with its reel 76 (both shown in phantom) have been positioned in holder 60.

One can appreciate the flexibility of holder 60 as designed by recognizing that the holder can be given a 180 degree turn so that cable 66 is forward and cable 68 is rearward—rod handle 74 remaining pointed in the direction shown. If holder 60 is turned 180 degrees, cable 66 can be "flipped" to form an under-arc and cable 68 can be "flipped" to form a bridge-arc to hold handle 74. Furthermore, it may be desirable to shift the location of cable 66 to accommodate handles of varying lengths. The means shown in FIG. 2a of securing cable 66 allows one to easily adjust its distance from cable 68.

Like FIG. 1, FIG. 2a illustrates curved rail end portion 36' in groove 42 of mounting block 40 so that positioning bar 44, threaded bolt 46, and wing nut 48 can secure curved rail end portion 36' into place. This collection of components operates as a tilt-adjust mechanism. Bolt 110 through hole 72 of mounting block 40 and hole 108 of washer 106, can be used with a nut (not shown) for swivel engagement of holder 60 to the folding stand illustrated in exploded view. This collection of components can operate as a swivel strike indicator by allowing rod handle 74 held by holder 60 to rotate about bolt 110 alerting an individual of a fish strike and aiding in setting the hook.

The stand in FIG. 2a includes a bottom strip member 82, the upper end of which has a width w, and a top strip member 90. Bottom strip 82 has a ledge 84, a hole 88, and spiked lower end 86. Top strip 90 has a ledge 92 with hole 104 therethrough and projections 94, 96 located a distance apart greater than width w so that bottom strip 82 can be locked into place once nut 102 is tightened against bolt 100 through holes 88, 98. The spiked lower end 86 of bottom strip 82 is inserted into the ground by pushing on ledge 84.

The frame of FIG. 2b has: a pair of rails 32'', 34''; a curved rail end portion 36'' which extends downwardly and back under rails 32'', 34'' to form an L-shape having legs 78, 80; and bent rail section 38'' between rails 32'', 34″ and curved rail end portion 36″. This frame can be interchanged with those in FIGS. 1, 2a, 3a, 4a, and 7 to fit with either mounting block 40 in FIGS. 1 and 2a, cylindrical vertical support member 144 in FIGS. 3a and 4a, or curved strip member 240 in FIG. 7. Suitable frame materials include those mentioned above for the frame 28 of FIG. 1.

FIG. 3a illustrates frame 120 having a rearward rod handle support loop 122, a forward upwardly extending pair of rails 124, 126 with forward rail ends 128, 130, and a central double rail portion 132, 134. The ends of cable 136 have been secured to rails 124, 126 in a manner similar to cables 12, 26 of FIG. 1 to produce beads 138 (and 139 of FIG. 3b). Cable alternatives are as discussed above for FIG. Mounting brackets 140, 142 each have a fore-aperture such as 140f and an aft-aperture such as 140a through which the bent rods 152 (and 154 shown in FIGS. 3b and 3d) of tilt-adjust member 146, extend. Fore-aperture 140f and aft-aperture 140a are labelled on mounting bracket 140 of FIG. 3c. FIG. 3b illustrates how bent rod 154 extends through the fore-apertures of both mounting brackets 140, 142. Flaps (not labelled) on mounting brackets 140, 142 wrap around to receive rails 132, 134 (also shown in FIG. 3b). Central curvature 148 of member 146 can have location set undercuts 150 to aid in locating partially threaded J-bolt 156 against the central curvature to set the attitude of rod handle 135 and reel 137 (shown in phantom). Tilt-adjust member 146 as shown has an attitude adjustment range of approximately 110 degrees: this can be modified to cover other desired ranges by modifying the shape of central curvature 148.

Cylindrical vertical support member 144 has a threaded passage for threaded bolt 164 which can fit within annular recess 162 of circular cylindrical mounting block 160 when the mounting block 160 is inserted into the bottom end of vertical support member 144. Vertical support member 144 is shown as a circular cylinder, however, it is only critical that the lower portion which receives mounting block 160 be circular cylindrical so that the mechanism can operate as a swivel strike indicator. Annular recess 162 in operation with bolt 164, allow 360 degree rotation of holder 120 without risk of having vertical support member 144 pull up and off the mounting block 160. Socket 166 can receive the end of bolt 164 to lock the position of the holder in place, if desired. Frame 120 and tilt-adjust member 146 can be made of materials similar to those suggested for frame 28 of FIG. 1.

Turning to FIG. 3b, cylindrical vertical support member 144 has an upper passage (at 154p as hidden lines) through which bent rod 154 extends and a lower passage (at 156p as hidden lines) through which J-bolt 156 extends. Wing nut 158 serves to hold J-bolt 156 against tilt-adjust member 146. This front view of the holder in FIG. 3a better illustrates how mounting brackets 140, 142 are coupled to rails 132, 134.

The left hand side view in FIG. 3c merely helps identify the location of the above-mentioned components.

FIG. 3d illustrates the tilt-adjust member 146 (with its bent rods 152, 154) and J-bolt 156 as they operate together.

Figure 4A:
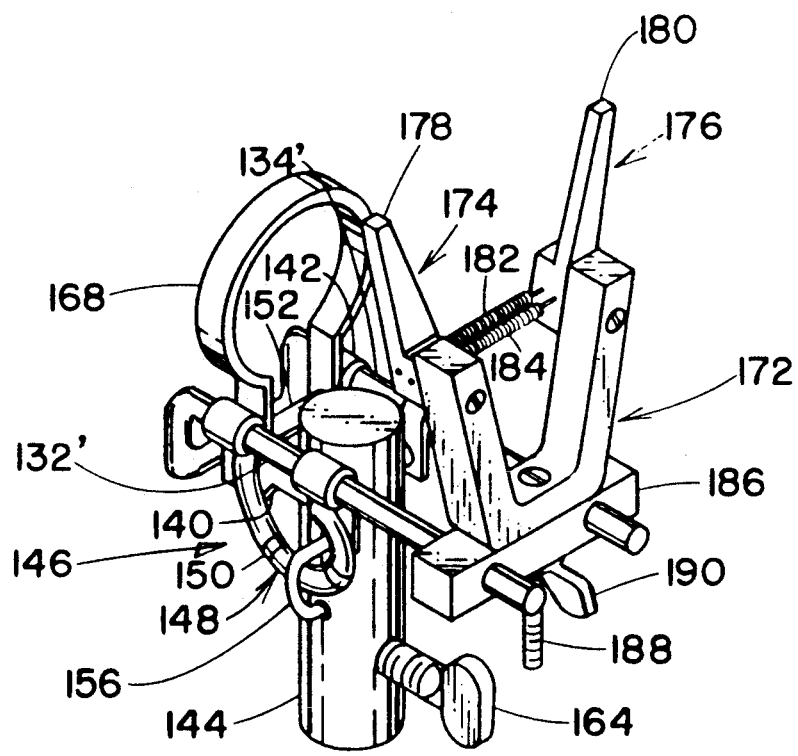
FIG. 4a is an isometric pictorial of another preferred holder of the invention.

The frame in FIG. 4a has a pair of rails 132′, 134′ and a forward two-prong forked mount 172 coupled to the rails by way of bracket 186, bolt 188, and nut 190. The bracket 186 can be made of metal, alloy, molded plastic, or other suitable materials. As an alternative for strength, rails 132′, 134′, bracket 186, and mounting brackets 140, 142 can be incorporated into a single planar-topped frame with sidewalls located where brackets 140, 142 are positioned. Fingers 174, 176, each pivotally mounted to a prong of forked mount 172, have tips 178, 180 which will move in unison toward each other when a downward force is applied to the cables (not labelled) encased by mechanical springs 182, 184. Vinyl or other suitable tubing, or an elastomeric coating, could replace springs 182, 184. Fingers 174, 176 have been designed so that tips 178, 180 are located in offset spaced relationship to one another for the reason stated above in relation to finger tips 18, 20 shown in FIG. 1. Suitable materials for fingers 174, 176 are the same as those mentioned above for fingers 14, 16 of FIG. 1.

Figure 4B:
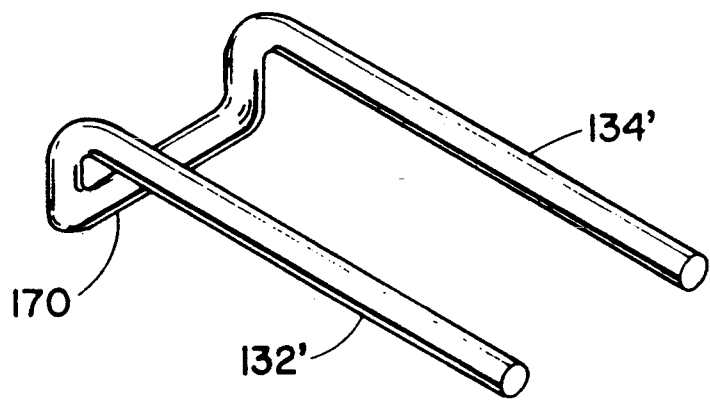

Frame section 170 (labelled in FIG. 4b) acts as a stop for collar 168, hinged to bent rail 152 of tilt-adjust member 146, should the collar be swung too far back. Mounting brackets 140, 142 are coupled to rails 132′, 134′ and tilt-adjust member 146 operates with J-bolt 156 and cylindrical vertical support member 144 (see also FIGS. 3a, 3b, 3c, and 3d for similar components). Rails 132′, 134′, section 170, collar 168, and forked mount 172 can be made from materials as mentioned above for frame 28 of FIG. 1.

Figure 5A:
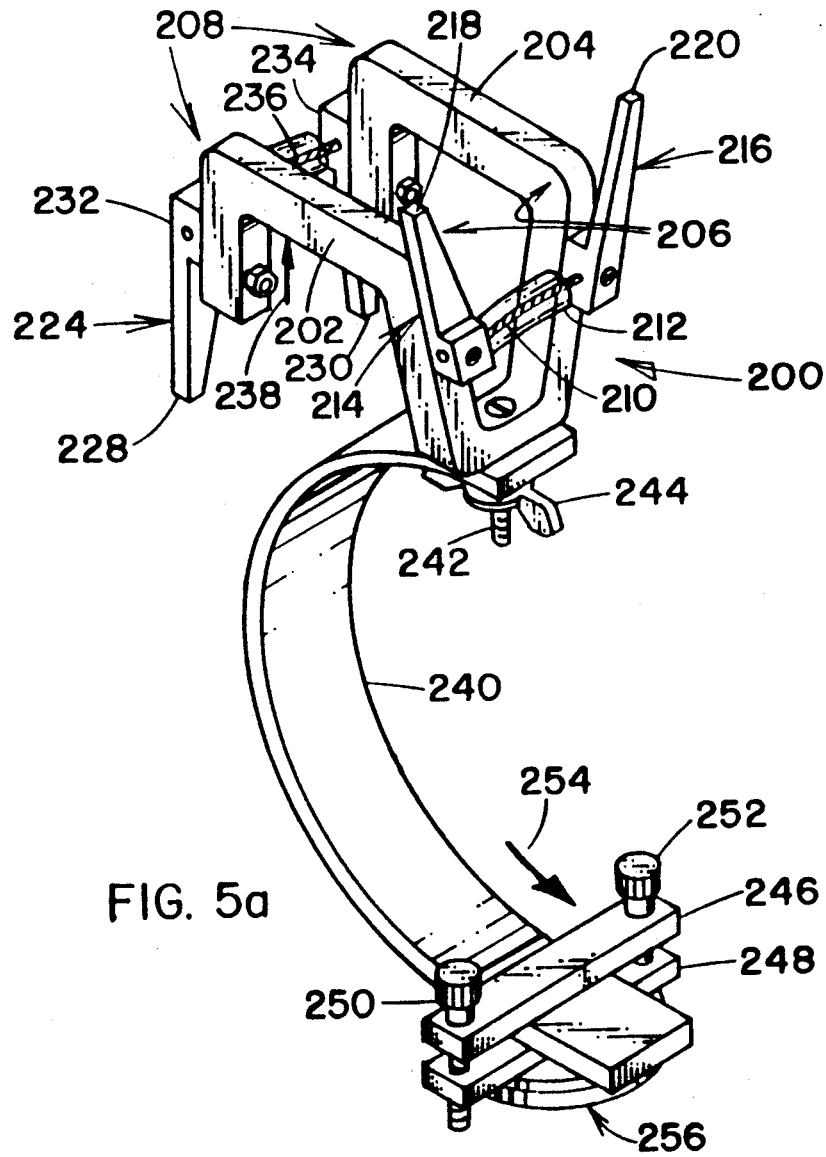
FIG. 5a is an isometric pictorial of another preferred holder of the invention illustrating a curved strip member in the shape of a "C" mounted to operate as a holder tilt adjustment.
Figure 5B:
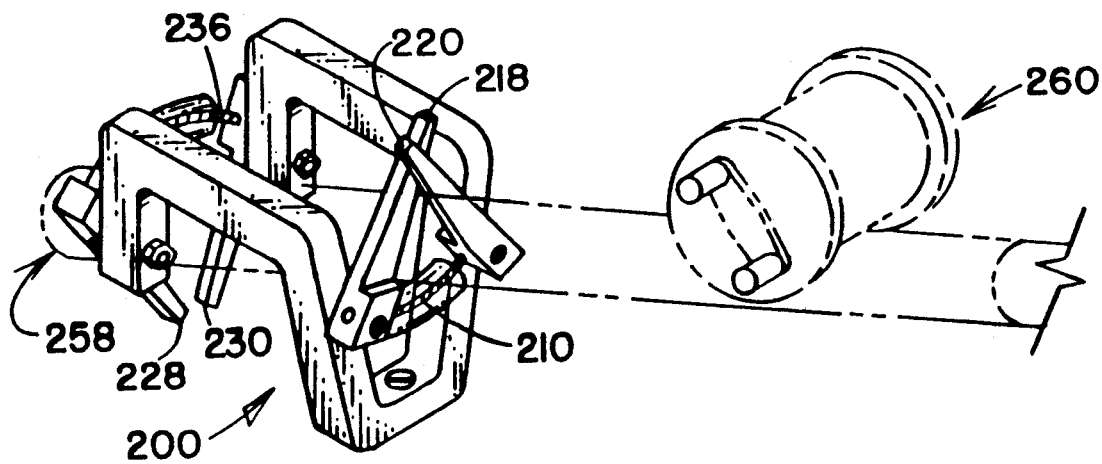
FIG. 5b illustrates the holder shown in FIG. 5a with a fishing rod handle and reel (in phantom) positioned in the holder.

Frame 200 of FIG. 5a is a fork having a pair of rails 202, 204 between a forward bent rail section 206 and a rearward bent rail section 208. Although illustrated as a single bar, frame 200 can be made from materials similar to those mentioned above for frame 28 in FIG. 1. A stronger frame 200 material and thicker cross-section may be desired if the holder of FIG. 5a is used to support a deep sea fishing rod or a pole holding a lantern at the end. Fingers 214, 216, designed like fingers 174, 176 of FIG. 4a, are each pivotally mounted to one prong of when a downward force is applied to cable 210 encased by clear tubing 212. The bottom end portions 232, 234 of an additional set of fingers 224 (and the other not labelled) are connected by cable 236 (also encased by clear tubing, not labelled) so that tips 228, 230 move toward one another when an upward force in the direction indicated by arrow 238 is applied to cable 236. The movement of tips 218, 220 and 228, 230 can best be understood by viewing FIG. 5b illustrating rod handle 258 with reel 260 (in phantom) positioned in the holder frame 200.

Frame 200 of FIG. 5a has been mounted securely to curved strip member 240, shown here in the shape of a "C", by way of threaded bolt 242 and nut 244. Suitable materials for curved strip member 240 include metals, alloys, resins, or other materials capable of taking on a desired curvature and capable of providing sufficient strength. Sandwiched between brackets 246, 248 is the bottom end of curved strip member 240. Bracket 248 and washers 256 (which can be one or more washers) are secured to a stand (not shown) by way of a bolt (not seen) for swivel engagement of the bottom end with the stand: this can serve as a swivel strike indicator. Curved strip member 240 can be moved in the direction indicated by arrow 254 and then positioned by threaded mounting screws or bolts 250, 252 which pinch together brackets 246, 248: this can serve as a tilt-adjust mechanism. Note that brackets 246, 248 can be replaced by a single piece having an opening for the bottom end of curved strip member 240. A set screw centrally located over the curved strip member can be used to position this single alternative bracket.

Figure 6:
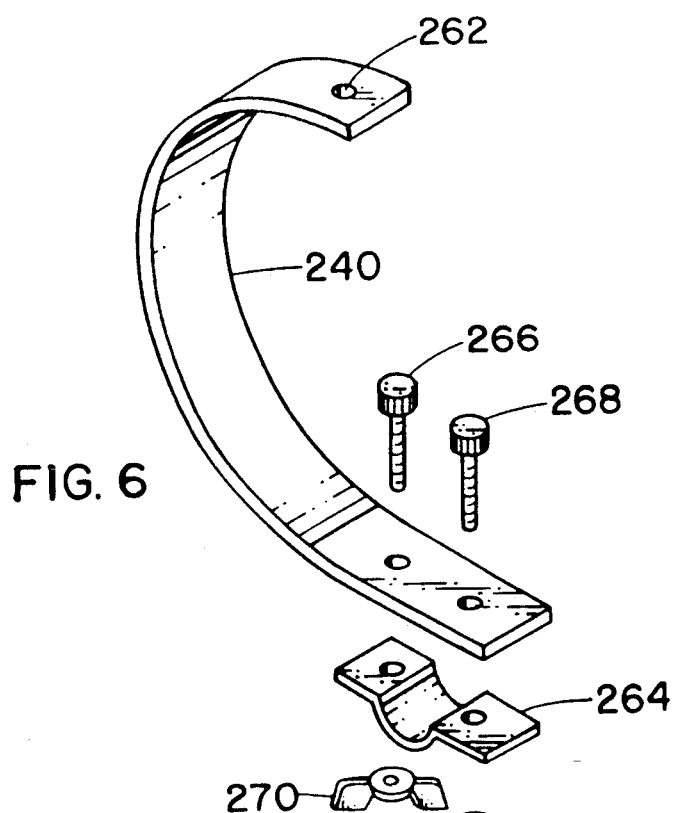
FIG. 6 illustrates the curved "C" strip member of FIG. 5a with a means for mounting the strip member to a rail.

FIG. 6 illustrates curved strip member 240 with a hole 262 at its top end for receiving bolt 242 (of FIG.

5a). Bracket 264 is shaped to sandwich a rail fixed to the side of a boat, for example, between it and the bottom end of curved strip member 240. Threaded bolts 266, 268 operate with nuts 270, 272 to mount the curved strip member 240 to the boat rail.

Figure 7:
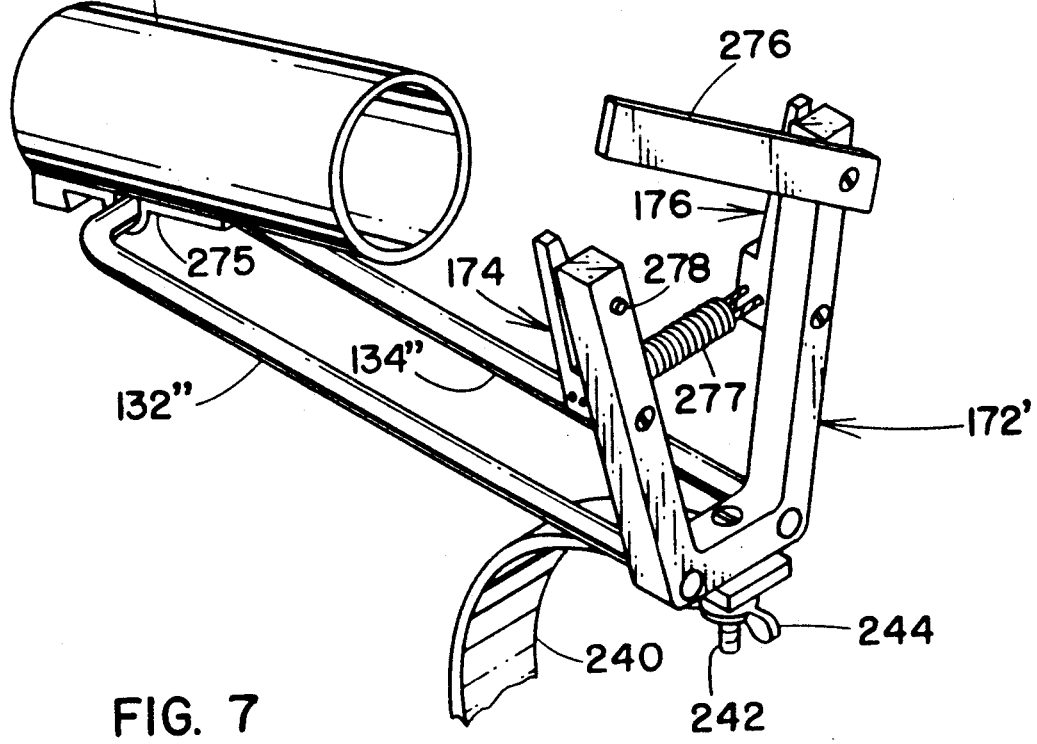
FIGS. 7 and 8 are isometric pictorials of other preferred holders of the invention.

The holder shown in FIG. 7 has a frame with a pair of rails 132", 134" and a forward two-prong forked mount 172' coupled to the rails by way of extending the rails through holes in the forked mount 172'. Fingers 174, 176 are connected by two cables (not labelled) and mounted to forked mount 172' in a manner similar to that shown in FIG. 4a. The two mechanical springs 182, 184 of FIG. 4a have been replaced by a single spring 277. For heavy duty applications of the holder in FIG. 7, hinged cross-bar 276 and stop 278 operate to prevent a rod handle from accidental release. Hinge 275 couples sleeve 274 to the frame. Two-prong forked mount 172' has been mounted securely to curved strip member 240 (shown here in part) by way of threaded bolt 242 and nut 244.

The frame of FIG. 8 has a planar strip member 280 integral with a curved strip section shown in part at 282, which can take the shape of the curved strip member 240 of FIGS. 5a and 6. Two-prong forked mount 172", mounted to planar strip member 280, has fingers 284, 286 pivotally mounted to its prongs. Fingers 284, 286 connected by cable 285 operate in a manner similar to fingers 174, 176 and their connecting cables of FIG. 4a. Two-prong forked mount 292, also mounted to planar strip member 280, has a set of fingers 294, 296 connected by cable 295 so that tips 298, 300 move in unison toward each other when a force along direction arrow 302 is applied to cable 295. Again, the tips of fingers 284, 286 and fingers 294, 296 are located in offset spaced relationship.

Figure 9A:
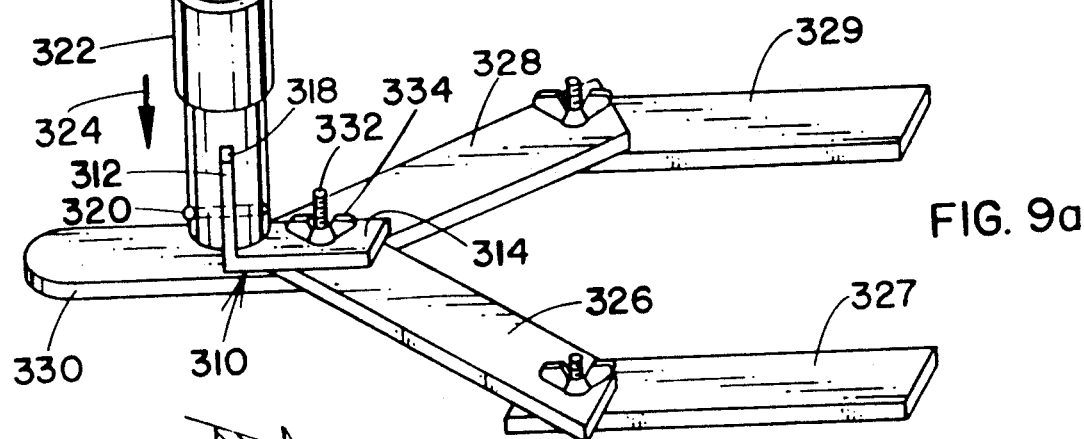
FIG. 9a is an isometric pictorial of another preferred folding stand of the invention.
Figure 9B:
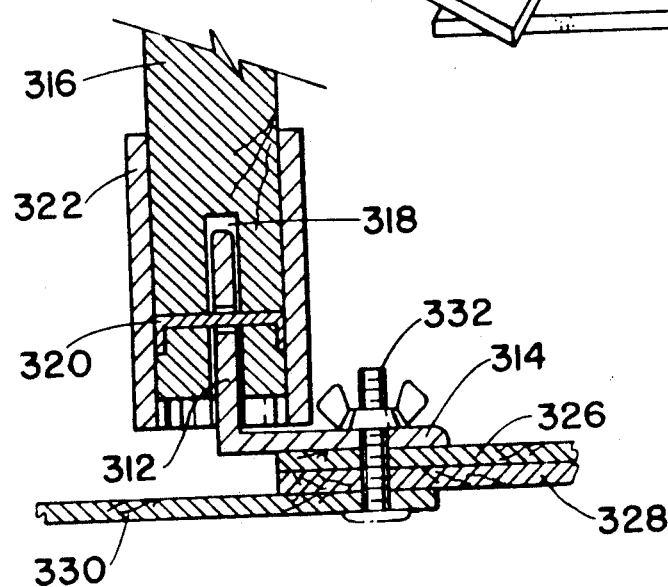

The folding stand in FIG. 9a has an L-bracket 310 with a vertical portion 312 and a horizontal portion 314. Vertical support member 316 has a slot 318 therethrough for receiving vertical portion 312. One can interchange both the vertical support member 316 and sleeve 322, with top strip 90 of FIG. 2a. To do this, one would pivotally engage the top strip in locking fashion with L-bracket 310 in a manner similar to the way top and bottom strips 90, 82 engage. Hidden lines indicate where pin 320 is located for pivotal movement of vertical support member 316 to form a fold joint for the stand. Sleeve 322 can be slid along the direction indicated by arrow 324 and positioned (as shown in FIG. 9b) around the lower end of vertical support member 316 to "lock" the vertical support member in place. If top strip 90 of FIG. 2a is interchanged as above-mentioned, this strip-shaped vertical support member would use its projections 93, 96 to "lock" the member in place once a securing means such as a bolt and nut have been tightened. Mounted to the top of vertical support member 316 is circular cylindrical mounting block 160, although any mounting blocks or brackets shown herein may be used. First, second, and third extension supports 326, 328, 330 have been coupled with horizontal portion 314 by way of bolt 332 and nut 334 to allow the extension supports to fold together for easy transport of the stand. Extra extensions 327, 329 can be coupled to extension supports 326, 328 respectively if further lateral support is desired.

The enlarged, partial sectional view of FIG. 9b illustrates slot 318 with vertical portion 312 and pin 320 therethrough. Pin 320 can be fed through holes in both vertical support member 316 and vertical portion 312, as a straight member and then bent or hammered at each end to produce stops/heads at each end. If vertical support member 316 is wood (as cross-hatched), pin 320 can be embedded (as shown) in the support member 316 to provide clearance for movement of sleeve 322. Vertical support member 316 and extension supports 326, 328, 330 are shown to be made from wood, however, many suitable, sturdy materials may be used such as metal, alloy, or plastics.

By way of example only, holder was constructed similar to that shown in FIG. 1 with a frame 10 of ¼ inch diameter 6061 aluminum rod (cut to about 17 inches in length) having holes drilled therethrough for the ends of a 1/16 inch diameter galvanized aircraft cable cut to about 2.5 inches. The cable ends were soldered once threaded through the holes. Fingers 14, 16 were shaped from ⅜ inch thick 6061-t6 aluminum bar and 5/16 inch holes were drilled for cable 26 (cut to about 2.5 inches) to fit through. The ends of cable 26 were also soldered after insertion into the holes drilled therefor. The aluminum mounting block 40 is approximately 1.5 inches in length. Positioning bar 44 is 3/16"×⅜"×1" aluminum or plastic bar. Washer 52 has a diameter of ¾ inch.

By way of a second example, frame 200 (FIG. 5a) and two-prong forked mounts 172 (FIG. 4a), 172' (FIG. 7), 172" and 292 (FIG. 8) were made from ⅜"×⅜" 6061 aluminum bar bent to desired shape.

Wing nuts shown throughout may be replaced with hex nuts or other suitable internally threaded fasteners. One can appreciate that rearward rod handle supports, forward rod handle supports, frame configurations, horizontal tilt-adjust mechanisms, and swivel strike indicators described herein may be interchangeable. While certain representative embodiments and details have been shown for the purpose of illustrating the invention, it will be apparent to those skilled in this art that various modifications may be made to the invention without departing from the spirit or scope of the invention.

What is claimed is:

1. A holder for a rod having a handle, comprising:
a rearward rod handle support;
a forward rod handle support comprising a first and second finger each having a tip and a bottom end portion, said bottom end portions being connected by at least one cable;
said fingers mounted for pivotal movement of said tips in unison toward each other when a downward force is applied to said cable; and
a frame upon which said rearward and forward rod handle supports are mounted.

2. The holder of claim 1 wherein said tips are located in offset spaced relationship to one another and said frame comprises:
a generally parallel pair of rails;
a curved rail end portion; and
a bent rail section therebetween, each of said bottom end portions of said first and second fingers pivotally mounted on one of said pair of rails nearby said bent rail section.

3. The holder of claim 2 wherein said curved rail end portion extends downwardly and back under said pair of rails to generally form a C-shape.

4. The holder of claim 2 wherein said curved rail end portion extends downwardly and out away from said pair of rails to generally form a J-shape.

5. The holder of claim 2 further comprising a mounting block having a groove sized to receive said curved rail end portion, a positioning bar, and tightening means to secure said curved rail end portion between said mounting block and said 6. The holder of claim 5 wherein said tightening means comprises a threaded bolt passing through said positioning bar and said mounting block, and a nut.

7. The holder of claim 1 wherein said frame comprises a generally parallel pair of rails and a forward two-prong forked mount securely coupled thereto, said bottom end portion of said first finger is pivotally mounted to one prong of said forked mount, said bottom end portion of said second finger is pivotally mounted to the other prong of said forked mount, and said tips are located in offset spaced relationship to one another.

8. The holder of claim 7 wherein said rearward rod handle support comprises a hinged collar.

9. The holder of claim 8 wherein said hinged collar has two holes therethrough, and the holder further comprises:
- a first and second mounting bracket each having a fore-aperture and an aft-aperture, each of said mounting brackets securely coupled to one of said pair of rails;
- a cylindrical vertical support member having at least an upper and lower passage therethrough, said vertical support member located between said mounting brackets;
- a tilt-adjust member comprising a generally central curvature connecting a pair of bent rods, one of said pair of bent rods positioned substantially through said fore-apertures of said first and second mounting brackets and through said upper passage, another of said pair of bent rods positioned substantially through said aft-apertures of said first and second mounting brackets and through said holes;
- a partially threaded J-bolt extending through said lower passage; and
- a nut for holding said J-bolt in place against said generally central curvature.

10. The holder of claim 9 wherein said vertical support member is at least in part circular cylindrical in shape and has a third threaded passage, and the holder further comprises:
- a circular cylindrical mounting block with an annular recess; and
- a threaded bolt through said threaded passage for swivel engagement of said circular cylindrical mounting block with said vertical support member.

11. The holder of claim 10 wherein said circular cylindrical mounting block has a socket for receiving said threaded bolt to position said mounting block.

12. The holder of claim 7 wherein said rearward rod handle support comprises a hinged sleeve, and the holder further comprises a curved strip member having a top end upon which said frame is securely mounted, and a casing through which said cable extends.

13. The holder of claim 12 wherein said curved strip member has a bottom end with a hole therethrough, and the holder further comprises:
- a bracket beneath said bottom end for receiving a stand; and
- a threaded bolt passing through said hole and said bracket for securing said bottom end with said stand.

14. The holder of claim 1 wherein said frame comprises a fork comprising a generally parallel pair of rails between a forward end rearward bent rail section, said bottom end portion of said first finger pivotally mounted to one prong of said fork nearby said forward bent rail section, and said bottom end portion of said second finger pivotally mounted to another prong of said fork nearby said forward bent rail section.

15. The holder of claim 14 wherein said rearward rod handle support comprises:
- a third and fourth finger each having a tip and a bottom end portion, said bottom end portions of said third and fourth fingers being connected by at least one cable; and
- said bottom end portions of said third and fourth fingers mounted nearby said rearward bent rail section for pivotal movement of said third and fourth finger tips in unison toward each other when an upward force is applied to said cable connecting said third and fourth fingers.

16. The holder of claim 14 further comprising a curved strip member having a top end upon which said fork is securely mounted between said first and second fingers, and a bottom 17. The holder of claim 16 further comprising a washer sandwiched between said bottom end and a stand, and a threaded bolt passing through a bracket on said bottom end and said washer for swivel engagement of said bottom end with said 18. The holder of claim 1 wherein said frame comprises:
- a generally planar strip member having a forward end and a rearward end integral with a curved strip section;
- a first two-prong forked mount securely coupled to said strip member nearby said forward end, said bottom end portion of said first finger pivotally mounted to one prong of said first two-prong forked mount, and said bottom end portion of said second finger pivotally mounted to the other prong of said first two-prong forked mount; and
- a second two-prong forked mount securely coupled to said strip member nearby said rearward end.

19. The holder of claim 18 wherein said rearward rod handle support comprises:
- a third and fourth finger each having a tip and a bottom end portion, said bottom end portions of said third and fourth fingers being connected by at least one cable; and
- said bottom end portion of said third finger mounted to one prong of said second two-prong forked mount and said bottom end portion of said fourth finger mounted to the other prong of said second two-prong forked mount for pivotal movement of said third and fourth finger tips in unison toward each other when an upward force is applied to said cable connecting said third and fourth fingers.

20. A holder for a fishing rod having a handle, comprising:
- a frame comprising a generally parallel pair of rails each having a rearward rail end, a curved rail end portion, and a bent rail section between said pair of rails and curved rail end portion;
- a rearward cable having a first and second end each secured to one of said pair of rails nearby said rearward rail ends; and
- a forward cable having a first and second end each secured to one of said pair of rails nearby said bent rail section.

21. The holder of claim 20 wherein said curved rail end portion extends downwardly and back under said pair of rails to generally form a C-shape.

22. The holder of claim 20 wherein said curved rail end portion extends downwardly and out away from said pair of rails to generally form a J-shape.

23. The holder of claim 20 further comprising a mounting block having a groove sized to receive said curved rail end portion, a positioning bar, and tightening means to secure said curved rail end portion between said mounting block and positioning bar.

24. The holder of claim 20 wherein said curved rail end portion extends downwardly and back under said pair of rails to generally form an L-shape.

25. The holder for a rod having a handle, comprising:
 a frame comprising a rearward rod handle support loop, a forward upwardly extending pair of rails, and a central double rail portion therebetween;
 a cable having a first and second end each secured to one of said pair of rails;
 a first and second mounting bracket each having a fore-aperture and an aft-aperture, each of said mounting brackets securely coupled to one of said rails of said central double rail portion;
 a cylindrical vertical support member having at least an upper and lower passage therethrough, said vertical support member located between said mounting brackets;
 a tilt-adjust member comprising a generally central curvature having at least one location-set undercut, said generally central curvature connecting a pair of bent rods, one of said pair of bent rods positioned substantially through said fore-apertures of said first and second mounting brackets and through said upper passage;
 a partially threaded J-bolt extending through said lower passage; and
 a nut for holding said J-bolt in place against said generally central curvature.

* * * * *